Patented Feb. 3, 1942

2,272,038

UNITED STATES PATENT OFFICE 2,272,038

HEAT CONDUCTING REFRACTORY MATERIALS

John D. Morgan, South Orange, N. J., assignor to Cities Service Oil Company, New York, N. Y., a corporation of Pennsylvania No Drawing. Application July 7, 1938, Serial No. 217,975

2 Claims. (Cl. 106—66)

This invention relates to heat conducting refractory materials and the method of making the same.

More particularly the invention relates to high temperature refractories having a high thermal conductivity and good dielectric properties. Such refractories are well adapted for use in the manufacture of electrical heating elements by embedding an electric resistor element within the body of the material to make a heating unit. The preferred refractories have a comparatively small coefficient of expansion at high temperatures so that when the refractories are heated to a temperature of about 1700° F. there is a minimum of change in dimensions of the heating element. The preferred refractories are well adapted for high temperature operation. An electrical heater made of the refractories has a good electrical resistance property when operated continuously at temperatures in the range of 1600° to 1800° F.

One object of the invention is to provide a good inexpensive refractory material having good dielectric properties and high thermal conductivity properties.

Another object of the invention is to provide a refractory material which is capable of withstanding high temperature operations and is easily worked and molded to any desired shape.

A further object of the invention is to provide a high temperature refractory which is adapted for use in the manufacture of crucibles for melting metals, slags and the like without any appreciable erosion from the materials being melted.

With these and other objects in view the invention consists in the improved refractory hereinafter described and particularly defined in the claims.

The base constituents of the present refractory are silicon or ferrosilicons (usually having a silicon content of 70-85%) and silicon carbide. Both of these materials have high melting points and have high thermal conductive properties. Both of these materials are capable of conducting electricity, particularly at high temperatures. The refractory materials are bonded together with a high grade clay, such as sillimanite, kaolin, diaspore, ball clay or the like. The aluminum silicate, $Al_2SiO_5$, sillimanite, is preferred because of its excellent bonding qualities and good dielectric properties, although ball clay and kaolin also have good bonding properties and good dielectric properties. The bonding of the refractory materials is important in that superior results are obtained if the silicon and silicon carbide are thoroughly coated with the bonding material before the entire mass is fused into an integral unit. To accomplish this the silicon or ferrosilicon is ground to pass through a 140 to 150 mesh screen. The silicon carbide is likewise ground to pass through a 100 to 150 mesh screen. These fine materials are then mixed with a wet slurry of aluminum silicate. The wet slurry of aluminum silicate preferably contains from 25 to 50% by weight of water so that it will permit a thorough wetting and coating of the silicon and carbide materials with the aluminum silicate. After the materials have been thoroughly mixed the mixture is dried to evaporate excess moisture because the mixture is not well adapted for molding or pressing until the moisture content has been reduced below 20% by weight. A mixture containing approximately 15% by weight of moisture is well adapted for molding and pressing to attain any desired shape. The molded articles having the low percentage of moisture are capable of maintaining their shape while being fired and the articles are preferably bonded by heating to a temperature of 1500° F. or above for several hours to fuse and thoroughly unite the silicate with the ferrosilicon and silicon carbide.

Some classes of articles, such as thin crucibles and other odd shapes, require a cold setting or a low temperature hardening of the material. If this is desired the addition of from 1 to 5% by weight of sodium silicate or an equal percent of the waste paper sulfite liquor will allow the articles to be hardened at temperatures below 500° F. so that they may be handled and placed in a furnace for the final high temperature hardening at a temperature of approximately 1500° F. Furthermore such articles may have an initial hardening at temperatures below 500° F. and may be stored or held in this condition for long periods of time without deterioration before they are given their final hardening heating.

By the substitution of chromic oxide ($Cr_2O_3$), or any of the fused chromates, for the silicon carbide a satisfactory refractory can be produced which has good dielectric properties and high thermal conductivity. It is preferred, however, that the chromic oxide or fused chromates should be used in addition to or in conjunction with the silicon carbide.

Satisfactory refractory materials may be made in which the silicon content of the mixture varies from 80 to 20% by weight of the total, the silicon carbide varies from 70 to 15% by weight of the total, the aluminum silicate material varies from 5 to 60% of the total and the chromic oxide or fused chromate varies from 50 to 10% of the weight of the total.

A typical example of the product consists of 50% by weight of ferrosilicon, 30% by weight of silicon carbide, and 20% by weight of sillimanite.

Another example will be 50% by weight of ferrosilicon, 25% by weight of silicon carbide, 10% by weight of chromic oxide, and 15% by weight of aluminum silicate ($Al_2SiO_5$).

To either of these examples may be added 1 to 2% by weight of sodium silicate if it is desired to secure a low temperature cold setting plastic material.

Another example which has been found well adapted for the manufacture of electrical heating elements has the following composition:

55% by weight of 75% ferrosilicon, 30% by weight of silicon carbide, and 15% by weight of siliceous clay.

The preferred form of the invention having been thus described what is claimed as new is:

1. A heat conducting refractory comprising ferrosilicon 80 to 20% by weight, chromic oxide 50 to 10% by weight, and silicon carbide 70 to 15% by weight, bonded by 5 to 60% by weight of fused sillimanite.

2. A heat conducting refractory comprising ferrosilicon 80 to 20% by weight, silicon carbide 70 to 15% by weight, and sillimanite 30 to 5% by weight.

JOHN D. MORGAN.